US009959159B2

(12) United States Patent
Jayaraman

(10) Patent No.: US 9,959,159 B2
(45) Date of Patent: May 1, 2018

(54) DYNAMIC MONITORING AND PROBLEM RESOLUTION

(71) Applicant: International Business Machines Corporation, Armonk, NY (US)

(72) Inventor: Arunachalam Jayaraman, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 15/089,765

(22) Filed: Apr. 4, 2016

(65) Prior Publication Data

US 2017/0286200 A1 Oct. 5, 2017

(51) Int. Cl.
*G06F 11/00* (2006.01)
*G06F 11/07* (2006.01)
(52) U.S. Cl.
CPC ........ *G06F 11/079* (2013.01); *G06F 11/0721* (2013.01)
(58) Field of Classification Search
USPC ..................................... 714/25, 33
See application file for complete search history.

(56) References Cited

U.S. PATENT DOCUMENTS

| | | | |
|---|---|---|---|
| 6,606,304 B1* | 8/2003 | Grinter .................. | G06Q 10/10 340/573.4 |
| 7,099,879 B2 | 8/2006 | Tacaille et al. | |
| 8,645,529 B2 | 2/2014 | Doddavula | |
| 8,812,542 B1 | 8/2014 | Saring et al. | |
| 8,930,395 B2 | 1/2015 | Sharma et al. | |
| 9,071,510 B2 | 6/2015 | Simhon et al. | |

(Continued)

FOREIGN PATENT DOCUMENTS

| | | |
|---|---|---|
| CN | 102244767 A | 11/2011 |
| CN | 103684916 A | 3/2014 |

(Continued)

OTHER PUBLICATIONS

Overby, Stephanie, "10 IT Outsourcing Trends to Watch in 2014", CIO, Jan. 17, 2004, Printed, Oct. 30, 2015, 7 Pages, <http://www.cio.com/article/2378979/outsourcing/10-it-outsourcing-trends-to-watch-in-2014.html>.

(Continued)

*Primary Examiner* — Sarai E Butler
(74) *Attorney, Agent, or Firm* — Edward J. Wixted, III

(57) ABSTRACT

A method, computer program product, and system for dynamic relational integrated intelligent monitoring and problem resolution of systems is provided. An IT environment is monitored for a first symptom. The first symptom is a malfunction of at least one component of a plurality of components. In response to determining a first measurement deviates from a reference value, a first component is determined to be the cause component. In response to determining a monitoring tier of the cause component is activated, a plurality of measurements is determined for the plurality of components. A component with the greatest number of activated monitoring tiers is identified and compared to the cause component. Probe data for the plurality of components is collected. A probe ripple is determined, based on one or more components affected by the malfunction. A root cause of the first symptom is reported.

20 Claims, 7 Drawing Sheets

(56) References Cited

U.S. PATENT DOCUMENTS

| | | | |
|---|---|---|---|
| 2002/0083371 A1* | 6/2002 | Ramanathan | G06F 11/2294 714/37 |
| 2006/0020866 A1 | 1/2006 | Lo et al. | |
| 2011/0145392 A1 | 6/2011 | Dawson et al. | |
| 2011/0276840 A1* | 11/2011 | Fresson | G06F 11/076 714/47.2 |
| 2013/0275814 A1* | 10/2013 | Nayak | G06F 11/3006 714/47.2 |
| 2014/0082612 A1 | 3/2014 | Breitgand et al. | |
| 2014/0337431 A1 | 11/2014 | Naseh et al. | |
| 2014/0372803 A1* | 12/2014 | Park | G06F 11/079 714/37 |
| 2015/0019915 A1* | 1/2015 | Kospiah | G06F 11/302 714/38.1 |

FOREIGN PATENT DOCUMENTS

| | | |
|---|---|---|
| CN | 104378262 A | 2/2015 |
| WO | 2012047746 A2 | 4/2012 |
| WO | 2014049389 A1 | 4/2014 |

OTHER PUBLICATIONS

Overby, Stephanie, "Virtual Engineers Could Transform IT Outsourcing", CIO, Aug. 29, 2014, Printed Oct. 30, 2015, 3 pages, <http://www.cio.com/article/2600329/outsourcing/virtual-engineers-could-transform-it-outsourcing.html>.

"Autonomic IT Management", IPSOFT, Printed Oct. 30, 2015, 5 Pages, <http://www.ipsoft.com/what-we-do/it-process-automation-with-ipcenter/>.

"Automated Monitoring and Event Recovery of VBLOCK Infrastructure Platforms with IPSOFT Managed Service", VCE, May 2011, ©2011 VCE Company, LLC., 20 Pages.

* cited by examiner

Probe Ripple Table at t0

| Component | Cause/Effect | Probe Triangle and Depth |
|---|---|---|
| E1a | Direct | SLA / SLA-1 |
| E1b | Direct | SLA / SLA-1 |
| E1c | Direct | SLA-1 / SLA-2 / SLA-n |
| E1d | Direct | SLA / SLA-1 / SLA-2 |
| E1e | Direct | SLA / SLA |
| E1f | Cause | |
| E2a | Indirect | SLA / SLA-1 / SLA-2 |
| E2b | Indirect | SLA / SLA-1 / SLA-2 |
| E2c | None | Shallow Monitoring |
| E2d | Indirect | SLA / SLA-1 / SLA-2 |

FIG. 6a

Probe Ripple Table after Locus Shift

| Component | Cause/Effect | Probe Triangle and Depth |
|---|---|---|
| E1a | Indirect | SLA / SLA-1 |
| E1b | Indirect | SLA / SLA-1 |
| E1c | Cause | SLA-1 / SLA-2 / SLA-n |
| E1d | Indirect | SLA / SLA-1 / SLA-2 |
| E1e | Indirect | SLA / SLA |
| E1f | Direct | SLA-1 / SLA-2 |
| E2a | Indirect | SLA / SLA-1 |
| E2b | Direct | SLA / SLA-1 / SLA-2 |
| E2c | Indirect | Shallow Monitoring |
| E2d | Indirect | SLA / SLA-1 / SLA-2 |

FIG. 6b

DYNAMIC MONITORING AND PROBLEM RESOLUTION

BACKGROUND OF THE INVENTION

The present invention relates generally to the field of system monitoring, and more particularly to dynamic relational intelligent integrated monitoring and problem resolution of systems.

Information technology (IT) infrastructure environments house computer systems and associated components. New and emerging technologies, such as cloud, converged systems, software defined environments (SDE), and software defined data centers (SDDC) add complexity to IT infrastructure environment management. Such IT infrastructure environments often require monitoring and problem resolution for maintenance of components. IT infrastructure environments include multiple computer systems, power supplies, communication connections, environmental controls, security devices, etc. Often, the failure of any one component can have a direct or indirect effect of any of the other components in the IT infrastructure environment.

SUMMARY

According to one embodiment of the present invention, a method for dynamic relational intelligent integrated monitoring and problem resolution of systems is provided. The method includes monitoring, by one or more processors, an IT environment for a first symptom, wherein the IT environment comprises a plurality of components, and wherein the first symptom is based on a first measurement of an attribute of a first component of the plurality of components, and wherein the first symptom is a malfunction of the at least one component; in response to determining the first measurement deviates from a reference value, determining, by one or more processors, the first component is a cause of the first symptom based, at least in part, on the first measurement; in response to determining a monitoring tier of the cause component is activated, determining, by one or more processors, a plurality of measurements for the plurality of components; identifying, by one or more processors, a component of the plurality of components with the greatest number of activated monitoring tiers, based on the plurality of measurements; determining, by one or more processors, whether the component with the greatest number of activated monitoring tiers is the cause component; collecting, by one or more processors, probe data for the plurality of components; determining, by one or more processors, a probe ripple, wherein the probe ripple comprises one or more affected components of the plurality of components, wherein the one or more affected components are affected by the malfunction; reporting, by one or more processors, a root cause of the first symptom based, at least in part, on the probe data and the probe ripple.

According to another embodiment of the present invention, a computer program product for dynamic relational intelligent integrated monitoring and problem resolution of systems is provided. The computer program product comprises a computer readable storage medium and program instructions stored on the computer readable storage medium. The program instructions include program instructions to monitor an IT environment for a first symptom, wherein the IT environment comprises a plurality of components, and wherein the first symptom is based on a first measurement of an attribute of a first component of the plurality of components, and wherein the first symptom is a malfunction of the at least one component; in response to determining the first measurement deviates from a reference value, program instructions to determine the first component is a cause of the first symptom based, at least in part, on the first measurement; in response to determining a monitoring tier of the cause component is activated, program instructions to determine a plurality of measurements for the plurality of components; program instructions to identify a component of the plurality of components with the greatest number of activated monitoring tiers, based on the plurality of measurements; program instructions to determine whether the component with the greatest number of activated monitoring tiers is the cause component; program instructions to collect probe data for the plurality of components; program instructions to determine a probe ripple, wherein the probe ripple comprises one or more affected components of the plurality of components, wherein the one or more affected components are affected by the malfunction; program instructions to report a root cause of the first symptom based, at least in part, on the probe data and the probe ripple.

According to another embodiment of the present invention, a computer system for dynamic relational intelligent integrated monitoring and problem resolution of systems is provided. The computer system includes one or more computer processors, one or more computer readable storage media, and program instructions stored on the computer readable storage media for execution by at least one of the one or more processors. The program instructions include program instructions to monitor an IT environment for a first symptom, wherein the IT environment comprises a plurality of components, and wherein the first symptom is based on a first measurement of an attribute of a first component of the plurality of components, and wherein the first symptom is a malfunction of the at least one component; in response to determining the first measurement deviates from a reference value, program instructions to determine the first component is a cause of the first symptom based, at least in part, on the first measurement; in response to determining a monitoring tier of the cause component is activated, program instructions to determine a plurality of measurements for the plurality of components; program instructions to identify a component of the plurality of components with the greatest number of activated monitoring tiers, based on the plurality of measurements; program instructions to determine whether the component with the greatest number of activated monitoring tiers is the cause component; program instructions to collect probe data for the plurality of components; program instructions to determine a probe ripple, wherein the probe ripple comprises one or more affected components of the plurality of components, wherein the one or more affected components are affected by the malfunction; program instructions to report a root cause of the first symptom based, at least in part, on the probe data and the probe ripple.

BRIEF DESCRIPTION OF THE DRAWINGS

FIG. 6a is a table depicting effects of the initial probe ripple on components of a mesh network, in accordance with an embodiment of the present invention;

FIG. 6b is a table depicting effects of the secondary probe ripple on components of a mesh network, in accordance with an embodiment of the present invention.

DETAILED DESCRIPTION

An embodiment of the present invention recognizes that shallow monitoring of IT infrastructure environment components can cause delay in problem resolution and root cause analysis. An embodiment of the present invention further recognizes that shallow monitoring of IT infrastructure environment components may not accurately capture the locus of the problem. Further, where the locus is not known, the cause-effect relationship with other IT infrastructure environment components may be difficult to determine.

An embodiment of the present invention provides a dynamic monitoring and problem resolution for IT infrastructure environment components. An embodiment of the present invention uses dynamic relational intelligent relational monitoring (DRiiM) to monitor the components of a IT infrastructure environment. DRiiM creates a relational mesh of the components, indicating a relationship of the components. In an embodiment of the present invention, each component of the IT infrastructure environment is monitored and various data is collected relating to the condition of each component. In some embodiments, relational mesh is used to determine the source of an error in the IT infrastructure environment and the effect of the error on related components.

Figure 1:
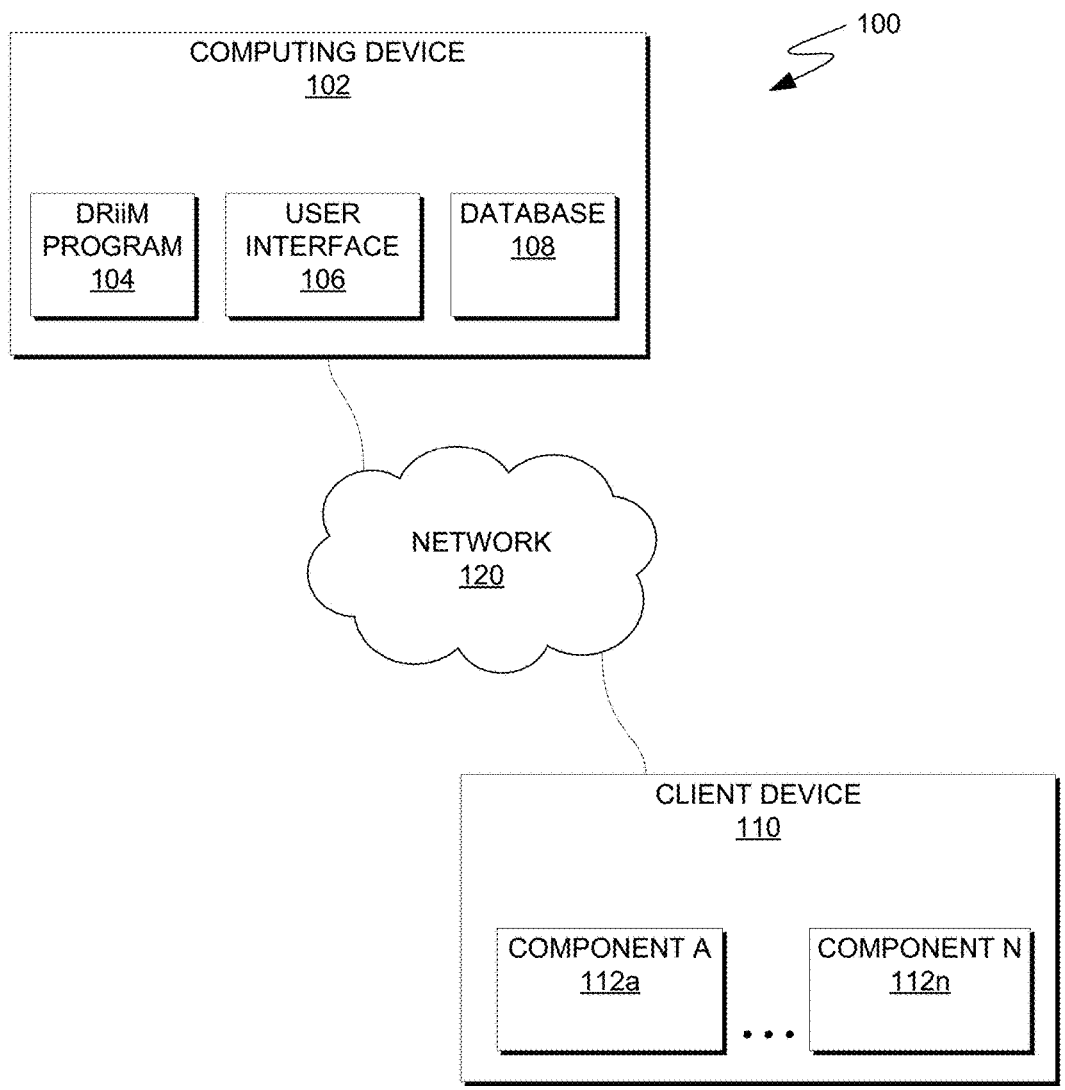
FIG. 1 is a functional block diagram illustrating a computing environment, in accordance with an embodiment of the present invention.

The present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes computing device 102 and client device 110 connected over network 120. Computing device 102 includes DRiiM program 104, user interface 106, and database 108.

In various embodiments, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to client device 110, and capable of executing DRiiM program 104 and is capable of accessing database 108. Computing device 102 may include internal and external hardware components, as depicted and described in further detail with respect to FIG. 7.

In this exemplary embodiment, DRiiM program 104, user interface 106 and database 108 are stored on computing device 102. In other embodiments, some or all of DRiiM program 104, user interface 106 and database 108 are stored on computing device 102 may reside on another computing device, provided that each can access and is accessible by each other of DRiiM program 104 and component A 112a through component N 112n. In yet other embodiments, DRiiM program 104 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 102 and client device 110, in accordance with a desired embodiment of the present invention.

DRiiM program 104 operates to monitor components of client device 110 (e.g., component A 112a through component N 112n). DRiiM program 104 monitors attributes of components at varying levels, based on a probe triangle, as described in detail in FIG. 4. In some embodiments, each component of client device 110 has a probe triangle that defines attributes to be monitored and related tolerances. For example, a component of client device 110 is a network interface controller (NIC), which has several attributes that can be monitored by DRiiM program 104. For example, DRiiM program 104 can monitor network collisions, packet errors, packet drops, and whether a link is up or down for the NIC. In some embodiments, each attribute is given a degree of tolerance which is defined in the probe triangle. The extent of monitoring of a component depends on a degree of error and a tolerance set by the probe triangle.

Computing device 102 includes a user interface (UI) 106, which executes locally on computing device 102 and operates to provide a UI to a user of computing device 102. user interface 106 further operates to receive user input from a user via the provided user interface, thereby enabling the user to interact with computing device 102. In one embodiment, user interface 106 provides a user interface that enables a user of computing device 102 to interact with DRiiM program 104. In some embodiments, user interface 106 provides a user interface that enables a user of computing device 102 to interact with component A 112a through component N 112n of client device 110 via network 120. In various examples, the user interacts with DRiiM program 104 in order to set degrees of tolerance for a component, access measured conditions for each component, and modify component data. In one embodiment, user interface 106 is stored on computing device 102. In other embodiments, user interface 106 is stored on another computing device (e.g., client device 110), provided that user interface 106 can access and is accessible by at least DRiiM program 104.

Database 108 is a data repository that may be written to and read by some or all of DRiiM program 104 and component A 112a through component N 112n. Component attributes, including thresholds and measurements received in the course of monitoring, may be stored to database 108. In some embodiment, determined component relationships (i.e., component mesh) is stores to database 108. In some embodiments, database 108 may be written to and read by programs and entities outside of computing environment 100 in order to populate the repository with component attribute thresholds and component relationships.

In various embodiments of the present invention, client device 110 can be a laptop computer, a tablet computer, a netbook computer, a personal computer (PC), a desktop computer, a personal digital assistant (PDA), a smart phone, or any programmable electronic device capable of communicating with computing device 102 via network 120. Client device 110 includes component A 112a through component N 112n (referred to collectively as components 112). In some embodiments, components 112 are any component of a IT infrastructure environment capable of being monitored (i.e., components with variable, measurable attributes). Components 112 may be hardware, software, processes, files, etc.

Figure 2:
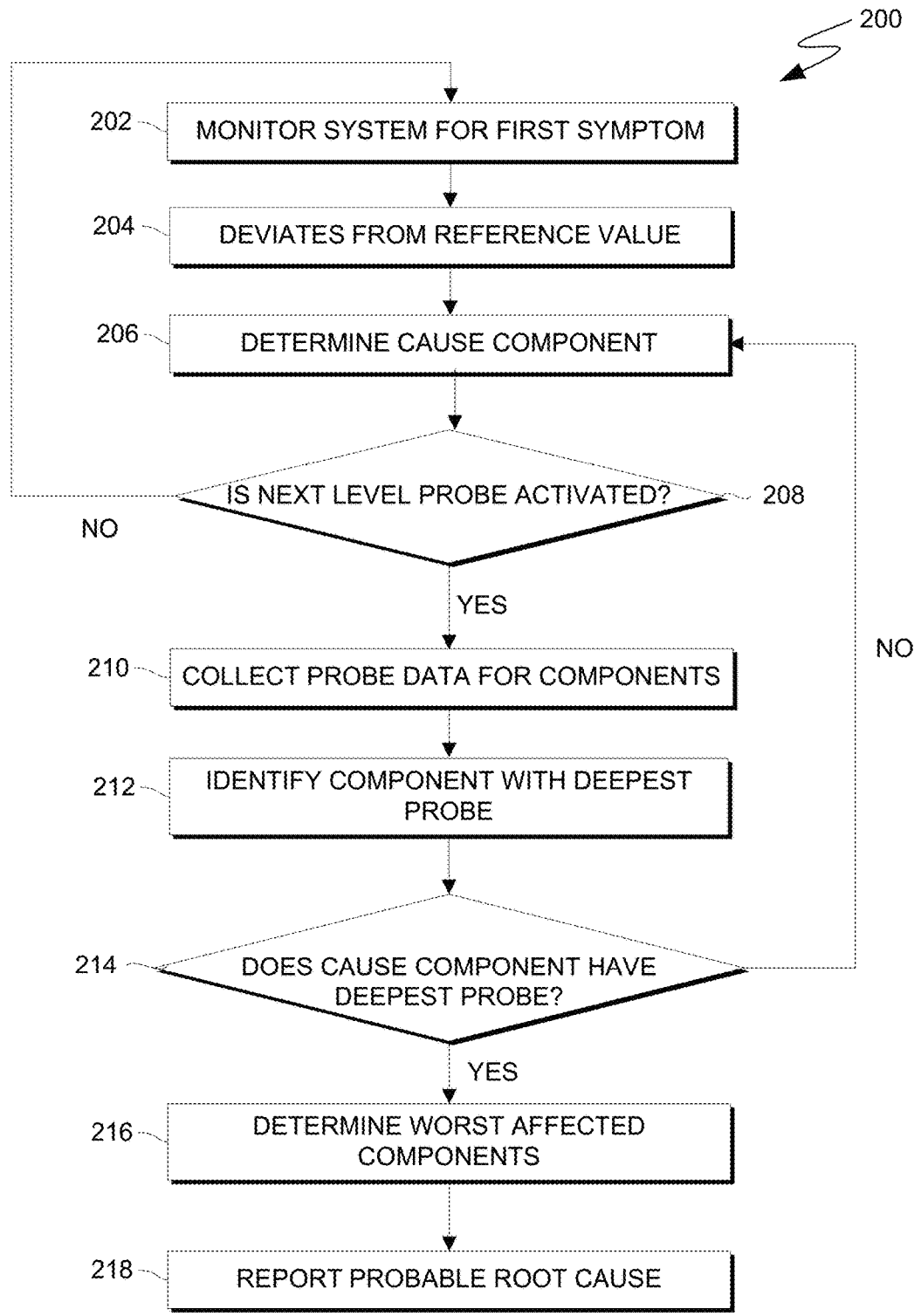
FIG. 2 is a flowchart depicting operations for dynamic monitoring and problem resolution of a system, on a computing device within the computing environment of FIG. 1, in accordance with an embodiment of the present invention.

FIG. 2 is a flowchart depicting operations for dynamically monitoring an IT infrastructure environment, on a computing device within the computing environment of FIG. 1, in accordance with an embodiment of the present invention. For example, FIG. 2 is a flowchart depicting operations 200 of DRiiM program 104, on computing device 102 within computing environment 100.

In step 202, DRiiM program 104 monitors the system for a first symptom. DRiiM program 104 performs a shallow level monitoring of components 112 of client device 110. In some embodiments, a shallow monitoring include monitoring one or more component attributes for abnormal activity. For example, where DRiiM program 104 is monitoring an IT infrastructure environment (e.g., client device 110) that contains a CPU, DRiiM program 104 may monitor the CPU for peak usage during the shallow monitoring. DRiiM program 104 monitors the peak usage of the CPU at a predetermined frequency (e.g., once per half hour). In some embodiments, DRiiM program 104 monitors multiple components simultaneously.

In step 204, DRiiM program 104 determines that an attribute measurement deviates from a reference value. In some embodiments, the reference value is pre-defined. For example, the reference value can be set by a user via a user interface. In another example, the reference value is defined by DRiiM program 104 based on component performance requirements. In some embodiments, attribute measurements have a degree of tolerance from the reference value (i.e., a threshold). Where a component has an attribute that has a measurement above the reference value for the shallow monitoring, DRiiM program 104 determines the measured value to be a first symptom.

In step 206, DRiiM program 104 determines a component to be the cause component. In response to monitoring components of client device 110, DRiiM program 104 determines one component (e.g., component A 112a) to be the cause of an incident of client device 110. In some embodiments, the cause component is determined based on the first component to have a monitored attribute above a threshold. In another embodiment, where multiple components have attributes above a threshold simultaneously, DRiiM program 104 determines the cause component based on predetermined hierarchy of components. For example, components hierarchy can be based on how a critical failure would affect the IT environment. In another example, component hierarchy can be based on the likelihood of component failure. In yet another embodiment, DRiiM program 104 determines the cause component based on the component having an attribute with the greatest deviation from the reference value.

In decision 208, DRiiM program 104 determines whether a next level probe of a probe triangle is activated for the cause component. Each probe level represents a monitoring tier for a component. For example, a component has a number (e.g., four) of monitoring tiers (i.e., probe levels), where each monitoring tier defines and attribute of the component to be monitored. A probe level is activated when the measured attribute value is above the defined threshold. In some example, an attribute measurement may be above a reference value, but below the threshold. In these examples, the elevated attribute value is a first symptom but does not activate the next level probe. Based on the measurements of each of the attributes, DRiiM program 104 determines the deepest probe activated for the cause component. In some embodiments, determining the probe level requires DRiiM program 104 to measure multiple attributes of the cause component. If DRiiM program 104 determines that the next level probe has been activated (decision 208, YES branch), DRiiM program 104 identifies all components with activated probes. If DRiiM program 104 determines that the next level probe has not been activated decision 208, NO branch), DRiiM program 104 continues to monitor the system for symptoms.

In step 210, DRiiM program 104 collects probe data for each of the components. In some embodiments, in response to DRiiM program 104 determining that a first component (i.e., the cause component) has attribute measurements that surpass at least a first threshold, DRiiM program 104 collects data on each component. In some instances, the collection of data will be in addition to standard monitoring of system components. For example, determining a cause component may happen mid-monitoring cycle of a second component that is scheduled to be monitored once every thirty minutes (e.g., twelve minutes after the second component data is collected). In this example, DRiiM program 104 will measure attribute values of the second component mid-monitoring cycle (e.g., at twelve minutes). In some embodiments, collection of probe data includes collecting data for each measurable attribute of each component.

In step 212, DRiiM program 104 identifies the component with the deepest probe. Base on the measurements collected in step 210, DRiiM program 104 determines probe activations for each of the components in the system. In some embodiments, the component with the deepest probe is the component having the most number of attributes being monitored. In one embodiments, where components do not have a uniform number of possible attributes to monitor, the component that has the highest percentage of attributes being monitored is the component with the deepest probe.

In decision 214, DRiiM program 104 determines whether the cause component has the deepest probe. In some examples, a component other than the cause component has the deepest probe. For example, where the component with the deepest probe was mid-monitoring cycle when deviation was measured in the cause component, the other component may have a deeper probe than the cause component. If DRiiM program 104 determines that the cause component has the deepest probe (decision 214, YES branch), DRiiM program determines a probe ripple for the components of the system. If DRiiM program 104 determines that cause component does not have the deepest probe (decision 214, NO branch), DRiiM program 104 determines a new cause component.

In step 216, DRiiM program 104 determines which components are the worst affected. Based on the data collect in step 210 and a component mesh stored in database 108, DRiiM program 104 determines which component are affected by the incident. In addition, DRiiM program determines a probe ripple. At the center of the ripple is the cause component. In some embodiments, DRiiM program 104 maps components related to the cause component that are affected by the incident. In some examples, components unrelated to the cause component are affected. In these example, some unrelated component may be included in the probe ripple.

In step 218, DRiiM program 104 reports the probable root cause. DRiiM program 104 reports the cause of the incident and all of the affected components to a user of computing device 102. In some embodiments, the report includes the level of failure of each component.

Figure 3:
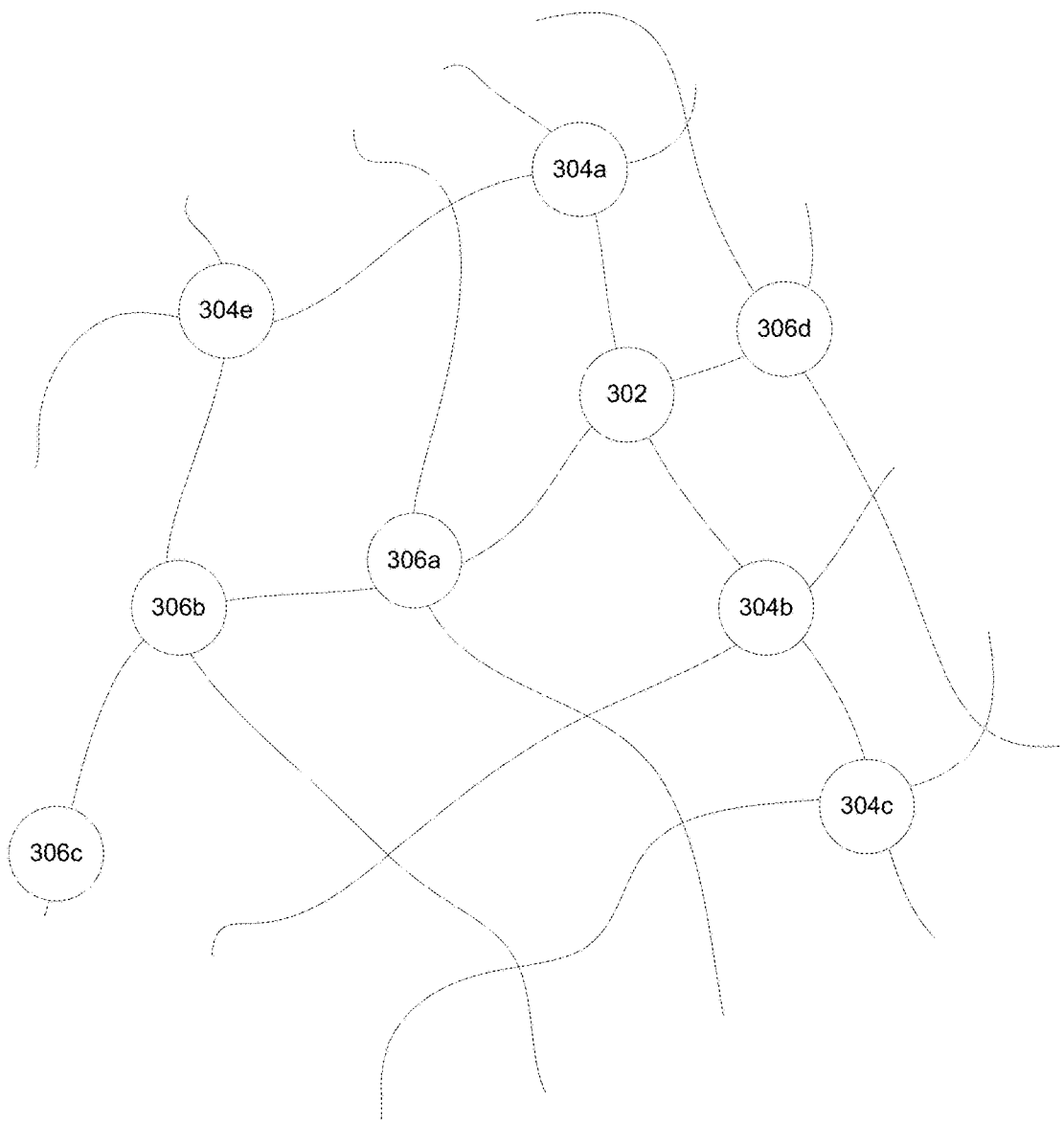
FIG. 3 is a depiction of a probe ripple in a mesh network, in accordance with an embodiment of the present invention.

FIG. 3 is a depiction of a probe ripple in a mesh network, in accordance with an embodiment of the present invention. For example, FIG. 3 is depiction of a mesh network of components 112 of client device 110, as created and used by DRiiM program 104 on computing device 102.

DRiiM program 104 creates a relational mesh of all of the components in the IT infrastructure environment (i.e., client device 110). The relational mesh describes how each of the components relates to each other. There are five possible relationships, including: forward linear relational components (FLRC), backward linear relational components (BLRC), upward peer relational components (UPRC), downward peer relational components (DPRC), and non-relational components (NRC). With reference to FIG. 3, component 302 is the reference component. Component 306a, component 306b, and component 306c are FLRCs. Component 306d is a BLRC. Component 304a is a UPRC. Component 304b and component 304c are DPRCs. Component 304e is a NRC. In some embodiments, more components are present in the relational mesh.

In one example, component 302 is a file system. Component 306a is volume, upon which the file system depends. Component 306b is a volume group, upon which the volume depends. Component 306c is a disk subsystem, upon which the volume group depends. As indicated by the relational mesh, component 302, 306a, 306b, and 306c are linearly related. Component 306d is an operating system. Component 304a is used inodes. Component 304b is orphan files and component 304c is old or unused files. Component 304e can be any component in the IT infrastructure environment that is not directly related to the file system (i.e., component 302). In this example, peer related components can cause the file system to be at maximum capacity. Whereas linear components can cause the file system to become unavailable. In some embodiments, a relational mesh is created for each of the components in the IT infrastructure environment. In some embodiments, the relational mesh is 3-dimensional, allowing DRiiM program 104 to create a single mesh for the entire environment.

Figure 4:
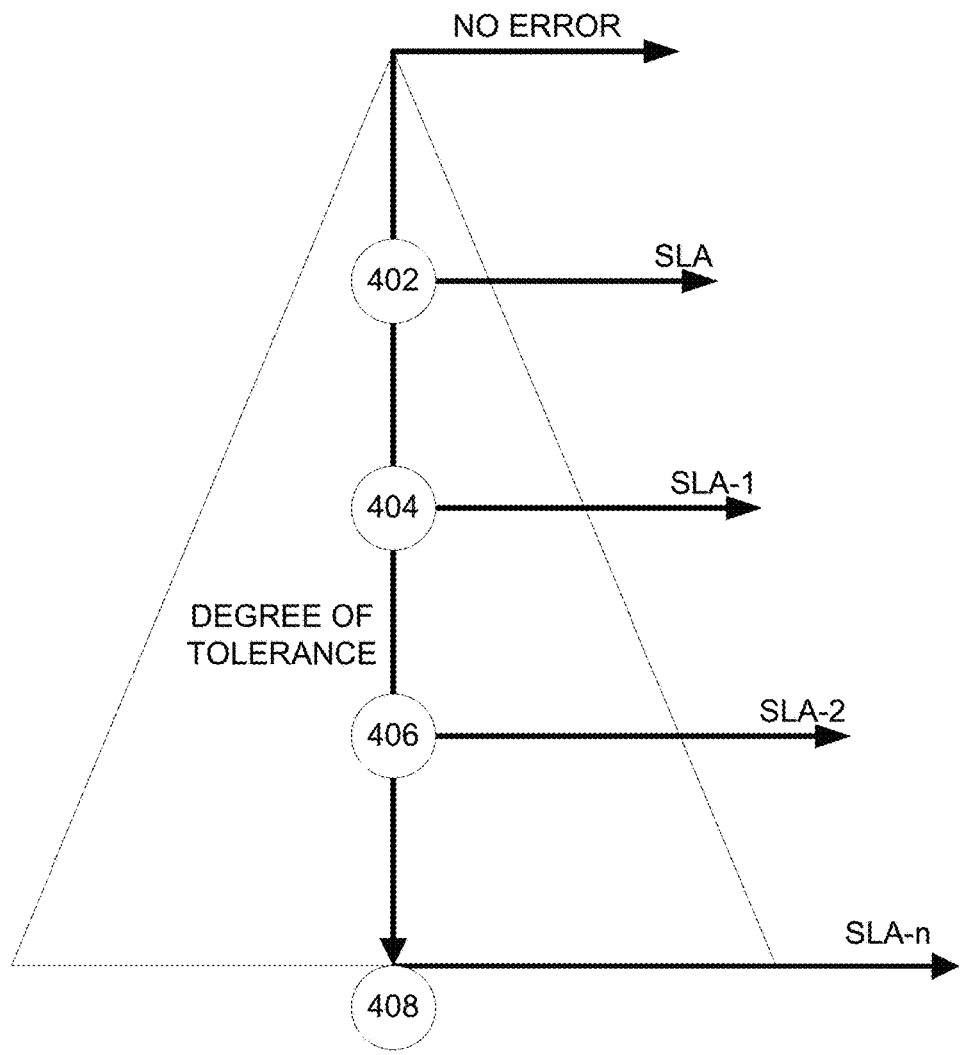
FIG. 4 is a depiction of a probe triangle for a component of a mesh network, in accordance with an embodiment of the present invention.

FIG. 4 is a depiction of a probe triangle for a component of a mesh network, in accordance with an embodiment of the present invention. For example, FIG. 4 is a depiction of a probe triangle of a component of client device 110, as created and used by DRiiM program 104 on computing device 102.

In some embodiments, each component of the IT infrastructure environment has a probe triangle, which describes the monitoring of each component. An example probe triangle is shown in FIG. 4. In some embodiments, each component has various attributes that can be monitored by DRiiM program 104. In some embodiments, DRiiM program 104 monitors the attributes of a component in layers. For example, a component may have four measurable attributes that indicate the health of a component. In one example, DRiiM program 104 monitors a first attribute at a frequency. In this example, the other attributes are not monitored unless the first attribute deviates from a reference point. When the first attribute deviates from the reference point, DRiiM program 104 continues to monitor the first attribute and begins to monitor a second attribute. Each layer of attributes is referred to as a surface level attribute (SLA). In some embodiments, the monitoring of a component, and component attributes, is defined by the probe triangle, starting at the point and ending at the base of the triangle. In some embodiments, the further down the probe triangle the attribute is located, the more indicative that that component is failing. For example, the point of the triangle represents the component with no error and the base of the triangle represents the component at complete failure (i.e., SLA-n). When no error is detected, DRiiM program 104 monitors the component at a surface level.

In some embodiments, each component is monitored at a predefined frequency. In some instances, the frequency is set by a user via the user interface. In other instances, the frequency is a standard used by DRiiM program 104. For example, each component is monitored at an interval (e.g., one minute). In some embodiments, the frequency of monitoring is different for each component. For example, a first component is monitored in one minute intervals, whereas a second component is monitored in five minute intervals. Each attribute is given a reference point and a degree of tolerance. As the measurement of the attribute deviates beyond the degree of tolerance the next level probe is activated. When the next level probe is activated, DRiiM program 104 doubles the monitoring frequency of previously activated probes and begins to monitor the next level probe. For example, when the surface level attribute is measured at a level exceeding the degree of tolerance, DRiiM program 104 begins to monitor the first attribute at 2× frequency and the second attribute at 1× frequency. Further, in an example where DRiiM program 104 measures the second attribute at a measurement above the degree of tolerance, DRiiM program 104 begins to measure a third attribute at 1× frequency, the second attribute at 2× frequency, and the first attribute at 4× frequency.

In one example, using FIG. 4 as a reference, a NIC is monitored by DRiiM program 104. In one embodiment, the NIC attributes include network collisions 402, received packet errors 404, packet drops 406, and network link 408. An example degree of tolerance for each attribute can be 25% for network collision 402, 50% for received packet errors 404, 75% for packet drops 406, and 100% network link 408. In this example, DRiiM program 104 monitors network collision 402 at a frequency (e.g., one per thirty minutes). If DRiiM program measures a deviation greater than 25% from a defined reference number for network collision 402, SLA-1 is activated. Upon activation of SLA-1 DRiiM program 104 begins to monitor network collision 402 at a frequency of once per fifteen minutes and monitors received packet errors 404 at a frequency of once per thirty minutes.

Figure 5B:
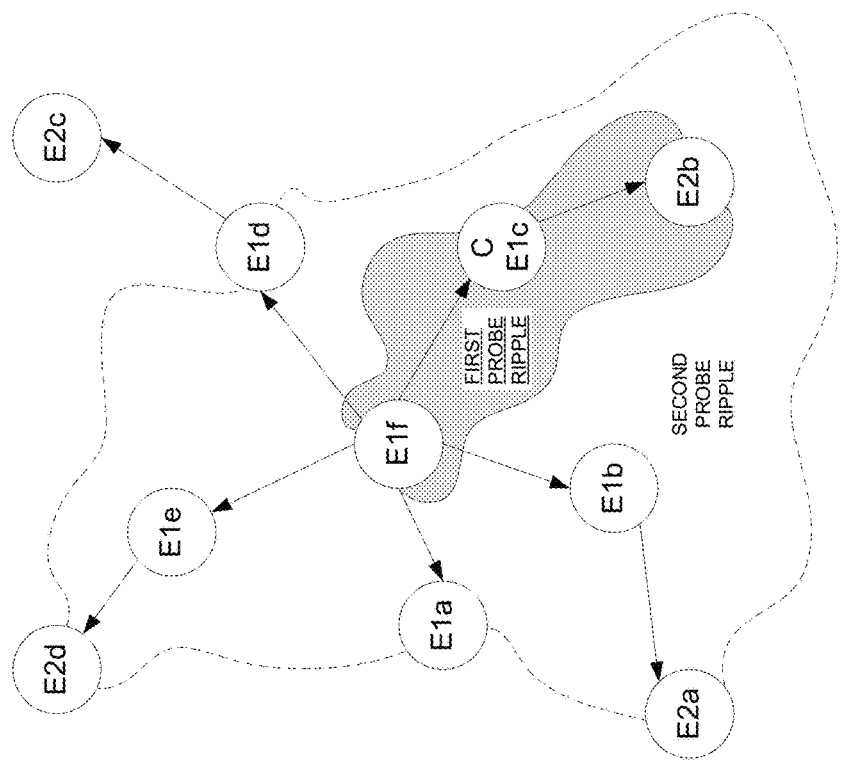
FIG. 5b is a depiction of a secondary probe ripple boundary for a mesh network, in accordance with an embodiment of the present invention.
Figure 5A:
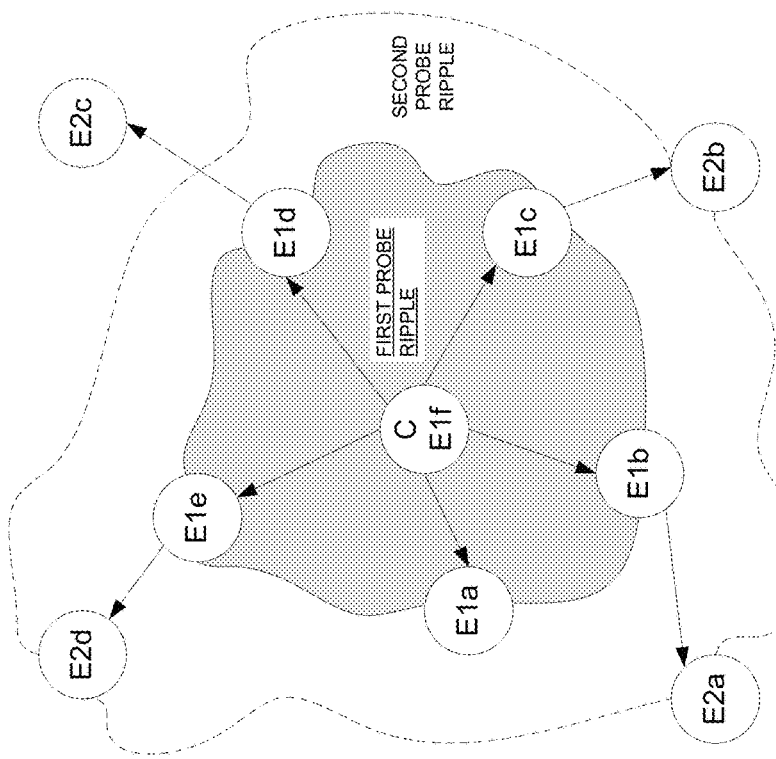
FIG. 5a is a depiction of an initial probe ripple boundary for a mesh network, in accordance with an embodiment of the present invention.

FIGS. 5a and 5b are depictions of probe ripple boundaries for a mesh network, in accordance with an embodiment of the present invention. For example, FIGS. 5a and 5b are an example of a probe ripple boundary for components 112 of client device 110, created by DRiiM program 104 on computing device 102, using operations 200.

FIGS. 5a and 5b is an example probe ripples reported by DRiiM program 104 after monitoring of a system containing at least 10 components. The creation of the probe ripples reported are describe via operations 200. DRiiM program 104, while monitoring the system, measures an elevated attribute measurement for component E1f (step 202). The elevated value deviates from a reference value for the attribute, where the reference value is stored in a database (e.g., database 108) (step 204). DRiiM program determines component E1f to be the cause component (e.g., based on it being the first component with an elevated attribute measurement) (step 206). DRiiM program 104 compares the attribute measurement to the reference value and the threshold defined by the probe triangle. Based on the comparison, DRiiM program 104 determines that at least the first level probe has been activated (decision 208). DRiiM program 104 collects data on each of the components in the system (step 210). Data collected is represented in FIG. 6a. FIG. 6a shows each component in the system, whether the component was affected by the incident (i.e., whether a probe was activated as a result on an incident), and the depth of probes activated. Based on the information collected, as presented in the chart in FIG. 6a, and a component mesh, DRiiM program 104 determines that each of the components directly related to component E1f are affected by the incident. The directly related components include: component E1a, component E1b, component E1c, component E1d, and component E1e. In addition, DRiiM program 104 determines that secondarily related components (i.e., component E2a, component E2b, and component E2d) were affected by the incident. Attribute measurements indicated that component E2c was not affected by the incident. Based on the data collected, DRiiM program 104 determines that E1c has the deepest level probe activated (step 212). The cause component, component E1f, is not the component with the deepest probe level activated (decision 214). Therefore, DRiiM program 104 returns to the step 206 of operations 200 to determine a new cause component.

DRiiM program 104 determines component E1c to be the new cause component based on component E1c having the deepest probe activated (step 206). Based on previous measurements, DRiiM program 104 determines that next level probes have been activated in the cause component (decision 208). DRiiM program 104 collects probe data for each of the components (step 210). Data collected is represented in FIG. 6b. FIG. 6b shows each component in the system, whether the component was affected by the incident (i.e., whether a probe was activated as a result on an incident), and the depth of probes activated. Based on the information collected, as presented in the chart in FIG. 6b, and a component mesh, DRiiM program 104 determines that each of the components directly related to component E1c are affected by the incident. The directly related components include: component E1f, and component E1b. In addition, DRiiM program 104 determines that secondarily related components (i.e., component E2a, component E2b, component E1a, component E1d, and component E1e and component E2d) were affected by the incident. Attribute measurements indicated that component E2c was not affected by the incident. Based on the data collected, DRiiM program 104 determines that E1c has the deepest level probe activated (step 212). Component E1c is both the cause component and the component with the deepest probe activated (decision 214). DRiiM program 104 determines the components most affected by the incident (step 216). DRiiM program 104 then reports the probable root cause, component E1c, to a user of computing device 102 (step 218). In some embodiments, the user will be presented with a chart, such as the chart depicted in FIG. 6b. In some embodiments, a user will be presented with a graph, such as the probe ripple depicted in FIG. 5b.

Figure 7:
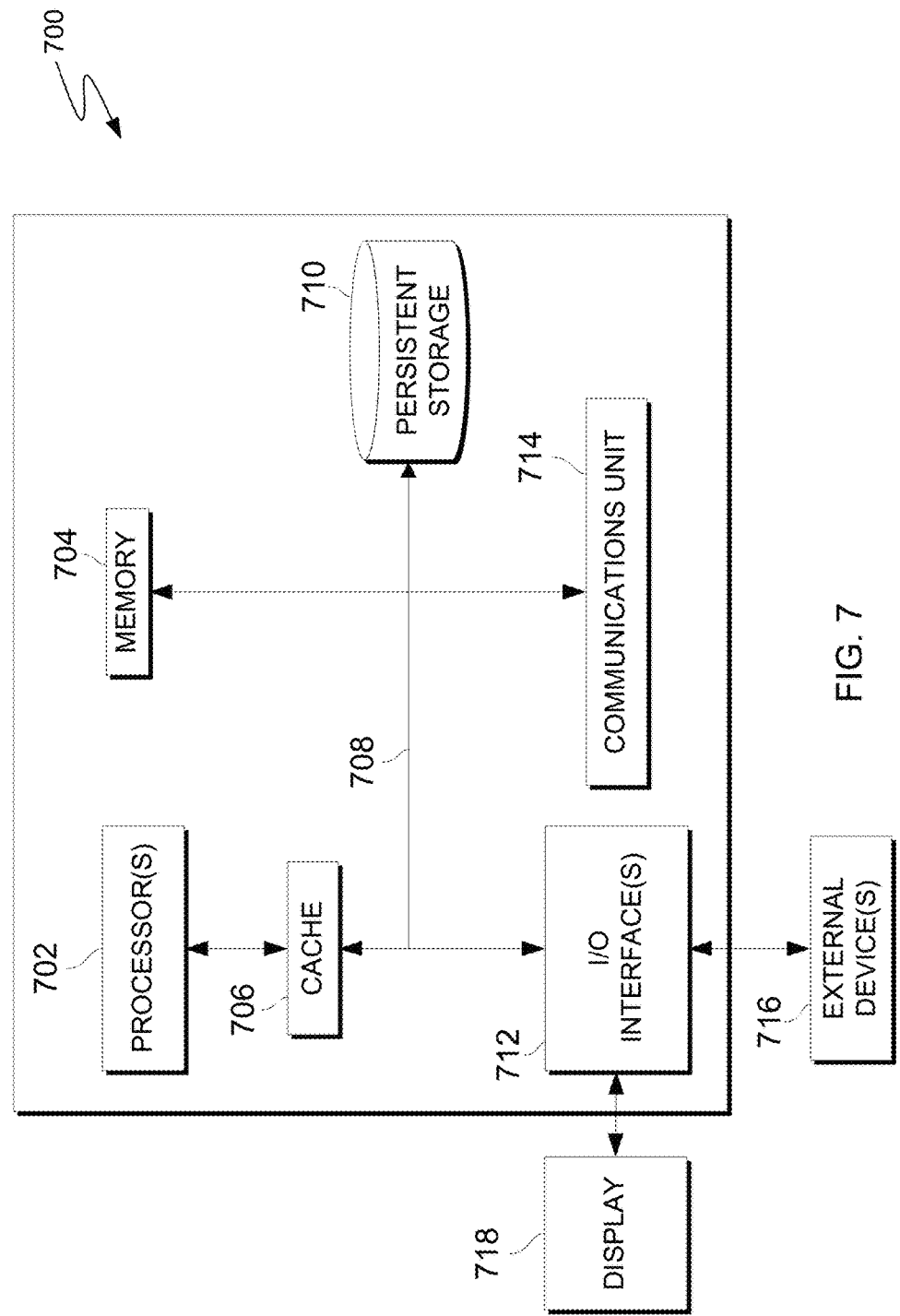
FIG. 7 is a block diagram of components of a computing device executing operations for dynamic monitoring and problem resolution of a system, in accordance with an embodiment of the present invention.

FIG. 7 is a block diagram of components of a computing device, generally designated 700, in accordance with an embodiment of the present invention. In one embodiment, computing device 700 is representative of computing device 102. For example, FIG. 7 is a block diagram of computing device 102 within computing environment 100 executing operations of DRiiM program 104.

It should be appreciated that FIG. 7 provides only an illustration of one implementation and does not imply any limitations with regard to the environments in which different embodiments may be implemented. Many modifications to the depicted environment may be made.

Computing device 700 includes communications fabric 708, which provides communications between computer processor(s) 702, memory 704, cache 706, persistent storage 710, communications unit 714, and input/output (I/O) interface(s) 712. Communications fabric 708 can be implemented with any architecture designed for passing data and/or control information between processors (such as microprocessors, communications and network processors, etc.), system memory, peripheral devices, and any other hardware components within a system. For example, communications fabric 708 can be implemented with one or more buses.

Memory 704 and persistent storage 710 are computer-readable storage media. In this embodiment, memory 704 includes random access memory (RAM). In general, memory 704 can include any suitable volatile or non-volatile computer readable storage media. Cache 706 is a fast memory that enhances the performance of processors 702 by holding recently accessed data, and data near recently accessed data, from memory 704.

Program instructions and data used to practice embodiments of the present invention may be stored in persistent storage 710 and in memory 704 for execution by one or more of the respective processors 702 via cache 706. In an embodiment, persistent storage 710 includes a magnetic hard disk drive. Alternatively, or in addition to a magnetic hard disk drive, persistent storage 710 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 710 may also be removable. For example, a removable hard drive may be used for persistent storage 710. Other examples include optical and magnetic disks, thumb drives, and smart cards that are inserted into a drive for transfer onto another computer-readable storage medium that is also part of persistent storage 710.

Communications unit 714, in these examples, provides for communications with other data processing systems or devices, including resources of network 120. In these examples, communications unit 714 includes one or more network interface cards. Communications unit 714 may provide communications through the use of either or both physical and wireless communications links. Program instructions and data used to practice embodiments of the present invention may be downloaded to persistent storage 710 through communications unit 714.

I/O interface(s) 712 allows for input and output of data with other devices that may be connected to computing device 700. For example, I/O interface 712 may provide a connection to external devices 716 such as a keyboard, keypad, a touch screen, and/or some other suitable input device. External devices 716 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 710 via I/O interface(s) 712. I/O interface(s) 712 also connect to a display 718.

Display 718 provides a mechanism to display data to a user and may be, for example, a computer monitor, or a television screen.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    monitoring, by one or more processors, an IT environment for a first symptom, wherein the IT environment comprises a plurality of components, and wherein the first symptom is based on a first measurement of an attribute of a first component of the plurality of components, and wherein the first symptom is a malfunction of the at least one component;
    in response to determining the first measurement deviates from a reference value, determining, by one or more processors, the first component is a cause of the first symptom based, at least in part, on the first measurement;
    in response to determining a monitoring tier of the cause component is activated, determining, by one or more processors, a plurality of measurements for the plurality of components;
    identifying, by one or more processors, a component of the plurality of components with the greatest number of activated monitoring tiers, based on the plurality of measurements;
    determining, by one or more processors, whether the component with the greatest number of activated monitoring tiers is the cause component;
    collecting, by one or more processors, probe data for the plurality of components;
    determining, by one or more processors, a probe ripple, wherein the probe ripple comprises one or more affected components of the plurality of components, wherein the one or more affected components are affected by the malfunction; and
    reporting, by one or more processors, a root cause of the first symptom based, at least in part, on the probe data and the probe ripple.

2. The method of claim 1, wherein each component of the plurality of components is expressed by a probe triangle, wherein the probe triangle defines a plurality of monitoring tiers, wherein each monitoring tier of the plurality of monitoring tiers comprises a condition and a degree of tolerance corresponding to the condition, and wherein a surface level attribute of each of the plurality of components is monitored at a first frequency.

3. The method of claim 1, further comprising:
    generating, by one or more processors, a three-dimensional probe ripple mesh, wherein the three-dimensional probe ripple mesh maps the relationship between the plurality of components in the IT environment.

4. The method of claim 3, wherein the relationship between each component of the plurality of components is selected from the list consisting of forward linear relational, backward linear relational, upward peer relational, and non-relational.

5. The method of claim 1, in response to determining the component with the greatest number of activated monitoring tiers is not the cause component:
    selecting, by one or more processors, a second cause component, wherein the second cause component is the component with the greatest number of activated monitoring tiers;
    collecting, by one or more processors, probe data for the plurality of components;
    determining, by one or more processors, a second probe ripple, wherein the second probe ripple is based on the second cause component wherein the second probe ripple comprises one or more affected components of the plurality of components, wherein the one or more affected components are affected by the malfunction; and
    reporting, by one or more processors, a root cause of the first symptom based, at least in part, on the probe data and the second probe ripple.

6. The method of claim 5, wherein the frequency of monitoring the surface level attribute is doubled in response to determining the next level probe of the cause component is activated.

7. The method of claim 6, wherein a next level attribute is monitored at the first frequency is response to determining the next level probe of the cause component is activated.

8. A computer program product comprising:
    a computer readable storage medium and program instructions stored on the computer readable storage medium, the program instructions comprising:
    program instructions to monitor an IT environment for a first symptom, wherein the IT environment comprises a plurality of components, and wherein the first symptom is based on a first measurement of an attribute of a first component of the plurality of components, and wherein the first symptom is a malfunction of the at least one component;
    in response to determining the first measurement deviates from a reference value, program instructions to determine the first component is a cause of the first symptom based, at least in part, on the first measurement;
    in response to determining a monitoring tier of the cause component is activated, program instructions to determine a plurality of measurements for the plurality of components;
    program instructions to identify a component of the plurality of components with the greatest number of activated monitoring tiers, based on the plurality of measurements;
    program instructions to determine whether the component with the greatest number of activated monitoring tiers is the cause component;
    program instructions to collect probe data for the plurality of components;
    program instructions to determine a probe ripple, wherein the probe ripple comprises one or more affected components of the plurality of components, wherein the one or more affected components are affected by the malfunction; and
    program instructions to report a root cause of the first symptom based, at least in part, on the probe data and the probe ripple.

9. The computer program product of claim 8, wherein each component of the plurality of components is expressed by a probe triangle, wherein the probe triangle defines a plurality of monitoring tiers, wherein each monitoring tier of the plurality of monitoring tiers comprises a condition and a degree of tolerance corresponding to the condition, and wherein a surface level attribute of each of the plurality of components is monitored at a first frequency.

10. The computer program product of claim 8, further comprising:
program instructions to generate a three-dimensional probe ripple mesh, wherein the three-dimensional probe ripple mesh maps the relationship between the plurality of components in the IT environment.

11. The computer program product of claim 10, wherein the relationship between each component of the plurality of components is selected from the list consisting of forward linear relational, backward linear relational, upward peer relational, and non-relational.

12. The computer program product of claim 8, in response to determining the component with the greatest number of activated monitoring tiers is not the cause component:
program instructions to select a second cause component, wherein the second cause component is the component with the greatest number of activated monitoring tiers;
program instructions to collect probe data for the plurality of components;
program instructions to determine a second probe ripple, wherein the second probe ripple is based on the second cause component wherein the second probe ripple comprises one or more affected components of the plurality of components, wherein the one or more affected components are affected by the malfunction; and
program instructions to report a root cause of the first symptom based, at least in part, on the probe data and the second probe ripple.

13. The computer program product of claim 12, wherein the frequency of monitoring the surface level attribute is doubled in response to determining the next level probe of the cause component is activated.

14. The computer program product of claim 13, wherein a next level attribute is monitored at the first frequency is response to determining the next level probe of the cause component is activated.

15. A computer system comprising:
one or more computer processors;
one or more computer readable storage media;
program instructions stored on the computer readable storage media for execution by at least one of the one or more processors, the program instructions comprising:
program instructions to monitor an IT environment for a first symptom, wherein the IT environment comprises a plurality of components, and wherein the first symptom is based on a first measurement of an attribute of a first component of the plurality of components, and wherein the first symptom is a malfunction of the at least one component;
in response to determining the first measurement deviates from a reference value, program instructions to determine the first component is a cause of the first symptom based, at least in part, on the first measurement;
in response to determining a monitoring tier of the cause component is activated, program instructions to determine a plurality of measurements for the plurality of components;
program instructions to identify a component of the plurality of components with the greatest number of activated monitoring tiers, based on the plurality of measurements;
program instructions to determine whether the component with the greatest number of activated monitoring tiers is the cause component;
program instructions to collect probe data for the plurality of components;
program instructions to determine a probe ripple, wherein the probe ripple comprises one or more affected components of the plurality of components, wherein the one or more affected components are affected by the malfunction; and
program instructions to report a root cause of the first symptom based, at least in part, on the probe data and the probe ripple.

16. The computer system of claim 15, wherein each component of the plurality of components is expressed by a probe triangle, wherein the probe triangle defines a plurality of monitoring tiers, wherein each monitoring tier of the plurality of monitoring tiers comprises a condition and a degree of tolerance corresponding to the condition, and wherein a surface level attribute of each of the plurality of components is monitored at a first frequency.

17. The computer system of claim 15, further comprising:
program instructions to generate a three-dimensional probe ripple mesh, wherein the three-dimensional probe ripple mesh maps the relationship between the plurality of components in the IT environment.

18. The computer system of claim 17, wherein the relationship between each component of the plurality of components is selected from the list consisting of forward linear relational, backward linear relational, upward peer relational, and non-relational.

19. The computer system of claim 15, in response to determining the component with the greatest number of activated monitoring tiers is not the cause component:
program instructions to select a second cause component, wherein the second cause component is the component with the greatest number of activated monitoring tiers;
program instructions to collect probe data for the plurality of components;
program instructions to determine a second probe ripple, wherein the second probe ripple is based on the second cause component wherein the second probe ripple comprises one or more affected components of the plurality of components, wherein the one or more affected components are affected by the malfunction; and
program instructions to report a root cause of the first symptom based, at least in part, on the probe data and the second probe ripple.

20. The computer system of claim 19, wherein the frequency of monitoring the surface level attribute is doubled in response to determining the next level probe of the cause component is activated, and wherein a next level attribute is monitored at the first frequency is response to determining the next level probe of the cause component is activated.

* * * * *